Jan. 23, 1968   J. D. SMITH   3,365,166
FUEL CONTROL VALVE
Filed March 13, 1964
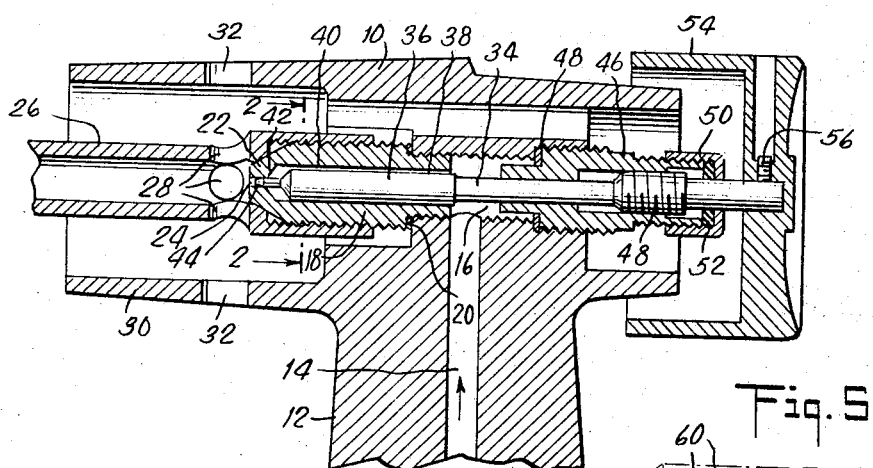
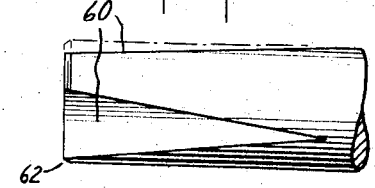
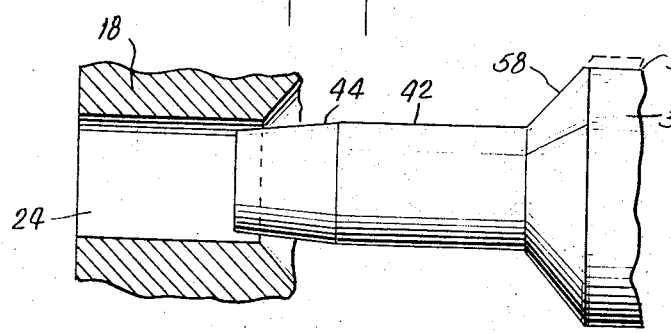
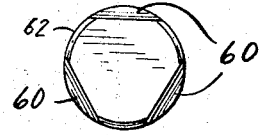
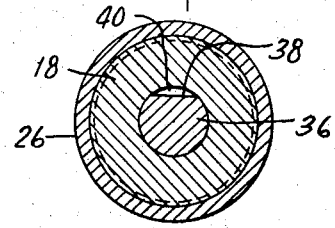
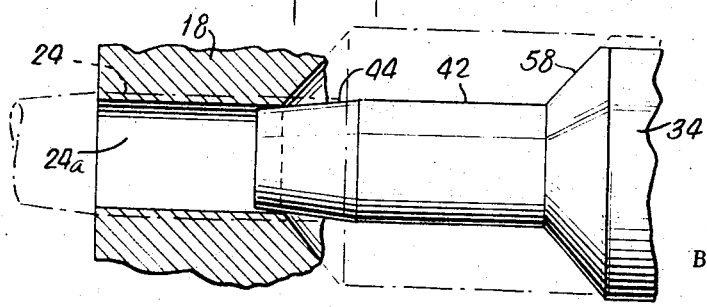
INVENTOR.
JAMES DONALD SMITH
BY
Ward, Neal, Haselton,
Orme & McElhannon
ATTORNEYS United States Patent Office 3,365,166
Patented Jan. 23, 1968

3,365,166
FUEL CONTROL VALVE
James D. Smith, Stroudsburg, Pa., assignor to Ronson Corporation, Woodbridge, N.J., a corporation of New Jersey
Filed Mar. 13, 1964, Ser. No. 351,722
10 Claims. (Cl. 251—121)

This invention relates to fluid control devices and more particularly it concerns improved valves for regulating the flow of gaseous fuels. The invention also relates to the manufacture of such valves.

Valve arrangements according to the present invention are particularly suitable for use in controlling the flow of high vapor pressure fuels such as butane and propane. Such fuels must be passed through extremely small orifices in order to reduce their pressure and still maintain a normal rate of flow. Because of the small orifice size required any changes thereof have an amplified effect on the flow rate. Thus an extremely high degree of precision has been required in the construction of adjustable orifices in order to obtain dependable and reasonably close control of fuel flow.

Prior art valve arrangements have generally incorporated conically shaped pin and orifice arrangements wherein a tapered pin is moved longitudinally into and out of a correspondingly tapered orifice. This varies the space between these two members so as to provide control of effective orifice size. While the degree of precision of orifice size control can be increased by making the pin taper more shallow, so as to require greater axial adjustment to produce a given change in effective orifice size, this shallow tapering has the disadvantage of enhancing the wedging action which takes place between the pin and the orifice when the valve is closed. Very often this results in distortion or damage to one or the other of these members. A further difficulty encountered with shallow tapers is that of maintaining exact conformity between the orifice and pin surfaces, and the manufacturing tolerances on these items as well as on their mountings must be held to very close limits so that they will mate properly in assembly.

According to the present invention there is provided a valve arrangement which affords fineness of control for high vapor pressure gases and yet has no tendency to jam or distort during use. Such valve arrangement, moreover, requires less precision of manufacture than comparable prior art valve arrangements. Further there is provided in connection with such novel valve arrangement an inherent self cleaning feature which renders unnecessary the use of wires, pins and similar prior art unclogging devices.

The above and other advantages are obtained, according to the present invention, through the provision of an enlarged orifice opening with straight, as opposed to tapered, inner surfaces and a shallowly tapered plunger having a maximum cross-section which conforms precisely to the orifice opening. The effective orifice size diminishes to zero when the tapered portion of the plunger is fully inserted into the valve seat opening, yet continued inward movement of the plunger produces no wedging action, although the valve remains completely shut off. The precise conformity of the orifice size to the maximum taper cross-section is accomplished by making the orifice initially somewhat smaller than the maximum cross-section of the tapered portion of the plunger. Then after the parts are mounted in assembly, the plunger is forced through the orifice so as to bring the two members into precise conformity.

The large orifice opening inherently prevents clogging since it is much larger than the particles of foreign matter present in the gases being controlled. Also any particles which collect between the tapered portion of the plunger and the orifice during operation of the valve are easily removed by merely withdrawing the plunger from the orifice and allowing the increased force of gas flow to sweep such particles out to the burner element.

There has been outlined rather broadly the more important features of the invention in order that the detailed description thereof that follows may be better understood, and in order that the present contribution to the art may be better appreciated. There are of course additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a side elevational view, taken in section, of a valve assembly incorporating the present invention;

FIG. 2 is a section view taken along lines 2—2 of FIG. 1;

FIG. 3 is an enlarged view, partially in section, illustrating the critical portions of the valve of the present invention during operation, and FIG. 4 is an enlarged view, partially in section, illustrating the dimensional relationship between the critical portions of the valve of the present invention before and during assembly;

FIG. 5 is a view similar to FIG. 3 but illustrating a modification to one portion of the valve; and FIG. 6 is an end view of the elements shown in FIG. 5.

The valve assembly shown in FIG. 1 is arranged within an outer housing 10. This outer housing, which is preferably formed of metal such as cast iron or cast aluminum, is provided with a lower extension 12 to which is connected a source of high vapor pressure fuel (not shown). The fuel passes upwardly through an inlet passage 14 in the lower extension 12 to a central chamber 16. The central chamber is generally cylindrical in shape and extends horizontally within the central portion of the outer housing 10.

A generally tubularly shaped valve seat member 18 is threadedly engaged with the outer housing 10 at one end of the central chamber 16, and is sealed therewith by means of a resilient washer 20. The outer end of the valve seat member is formed with a transversely extending wall portion 22 having a cylindrical orifice 24 extending axially therethrough. The valve seat member itself is preferably of a relatively soft material such as aluminum or brass so that the orifice may be sized in assembly in a manner to be described.

A fuel-air mixing device 26 is threadedly engaged with the valve seat member 18 exteriorly of its outer end so as to receive gases immediately as they pass through the orifice 24. The mixing device 26 is itself of tubular configuration and is provided with a plurality of openings or holes 28 circumferentially disposed in the vicinity of the orifice opening of the valve seat member. The expulsion of high velocity gases from the orifice 24 in the valve seat member produces a venturi effect at these circumferentially disposed holes and causes air to be drawn into the mixing device where it is blended with these gases to form a highly combustible mixture. This fuel-air mixture then proceeds out toward a burner or other combuston device (not shown).

The outer housing 10 may, if desired, be provided with a shield portion 30 which extends around the mixing device 26 to prevent accidental clogging of the air intake holes 28. This shield portion is open at its front end to admit air to the mixing device, and may additionally be provided with several circumferentially disposed openings 32 for additional air intake.

An elongated plunger member 34 extends axially through the central chamber 16 of the outer housing 10 and into the tubular valve seat member 18. The plunger member has a generally cylindrical forward portion 36 which moves longitudinally within and is guided by the tubular valve seat member alignment within the valve seat member. As shown most clearly in FIG. 2, the forward portion 36 of the plunger member is flattened as at 38 to provide a gas passageway 40 which communicates between the central chamber 16 and the orifice 24.

A cylindrical extension 42 which terminates in a tapered tip 44 protrudes axially outward from the front of the forward portion 36 of the plunger member 30 toward the orifice 24 in the valve seat member 18. The cylindrical extension 42 is preferably in precise peripheral conformity to the large end of the tapered tip 44. By moving the plunger member in an axial direction its tapered tip 44 is moved into and out of the orifice 24 to vary the effective orifice size and thus to control the flow rate of gases passing therethrough.

A rear support member 46 is threadedly engaged into the outer housing 10 at the rear of the central chamber 16 and is sealed thereto by means of a washer or gasket 48. The rear support member is also internally threaded and engages a threaded portion 48 at the rear of the plunger member 36. This allows the plunger member to be controlled in its longitudinal movements simply by rotating it within the outer housing. A rear cap 50 and a sealing gasket 52 sealably interconnect the rear support member 46 and the plunger member 36. The plunger member may be rotated by means of a knob 54 connected thereto by means of a setscrew 56.

Referring now to FIG. 3, there is shown an enlarged view of the cylindrical extension 42 and the tapered tip 44 of the plunger member 36 in operative positional relationship to the cylindrical orifice 24 in the transverse wall portion 22 of the valve seat member 18. As stated previously, the tapered tip 44 of the plunger member moves into and out of the cylindrical orifice 24 so as to vary its effective size. It will be noted that the orifice 24 itself is considerably larger in cross-sectional area than the maximum size required for operation of most devices utilizing butane type fuel. However, the effective orifice size as mentioned is a much smaller value by virtue of the relatively large cross-sectional area of the tapered tip 44 and the cylindrical extension 42 of the plunger member. The effective orifice size then becomes equal to the difference in cross-sectional areas between the actual size of the orifice 24 and the cross-sectional area of the portion of the tapered tip 44 just entering the orifice. Thus by movement of this tapered tip into and out of the orifice its effective size, and the fuel flow rate can be controlled.

The tapered tip 44 of the plunger member terminates abruptly at a point beyond that commensurate with maximum desired effective orifice size. Thus by withdrawing the plunger member just beyond this point the orifice size suddenly becomes increased to a point where all particles of foreign matter which had built up on the plunger tip and around the orifice entrance are swept out through the orifice by the greatly increased force of fuel flow therethrough.

It will be appreciated that by utilizing an enlarged orifice 24 in connection with a relatively large diameter tapered plunger tip 44 in order to produce the above described cleaning action, the effective orifice opening becomes annular in shape, comprising the region between the tapered surface of the plunger tip and the orifice entrance. As a result of this, the sensitivity of changes in effective orifice area to longitudinal or axial movement of the plunger member is considerably increased. This in turn makes it necessary to provide a more shallow taper at the plunger member tip 44. However, because the maximum cross-section of either the tapered tip 44 or the extension portion 42 never exceeds the cross-section of the orifice 24 no wedging action or other distortion or destructive effect whatever is produced by movement of the plunger tip into the orifice. Thus when the tapered tip 44 of the plunger member is inserted fully into the orifice, the plunger member may continue to move forward with the cylindrical extension 42 passing into the orifice without any effect being produced regarding fuel flow.

If desired, the plunger member 36 may be provided with a slightly tapered wall 58 interconnecting the forward portion 36 and the cylindrical extension 42, and the inner surface of the transversely extending wall portion 22 of the valve seat member 18 may be correspondingly tapered. This permits an extra lock seal to be achieved simply by screwing the plunger member in tight until these last mentioned surfaces seat against each other.

In order to insure precise conformity between the maximum cross-section of the tapered tip 44 of the plunger member and the orifice 24 in the transverse wall 22 of the valve seat member 18, these items are sized to each other during assembly of the valve. Such sizing procedure is illustrated in the enlarged view of FIG. 4. The plunger member and in particular its tapered tip 44 and extension portion 42 are preferably of a hard material, such as hardened steel, and ground to precise dimensions. The valve seat member 18 and more particularly its transverse wall 22, as stated previously, is preferably of a soft material such as brass or aluminum. Prior to assembly, a preliminary orifice 24a is formed in the transverse wall 22, this preliminary orifice being somewhat smaller than the maximum diameter of the tapered tip 44 of the plunger member and, of course, larger than the minimum tip diameter. When the valve is put into assembly, the plunger member is moved into the valve seat member causing the tapered tip 44 and the extension portion 42 to be forced into the preliminary orifice 24a. The tapered tip 44, being very shallowly tapered, causes a gradual enlargement of the orifice in precise conformity with the peripheral characteristics of its maximum diameter. As is shown in the dotted line arrangement of FIG. 4, the plunger extension portion 42 is slightly longer than the width of the transverse wall 22 so that during manufacture the entire orifice is sized in conformity with the maximum tapered cross-section. This removes all tapering of the inner orifice surfaces and ensures against any wedging action produced by the tapered portion of the plunger member during operation of the valve due to inadvertent tightening down of the control knob 54.

In a valve utilizing butane gas for supplying a heater, it was found that an effective maximum orifice cross-sectional area of one ten-thousandth of a square inch was best controlled and still provided with a self-cleaning effect by producing in the transverse wall 22 an orifice of .028 inch diameter or six ten-thousandths of a square inch in cross-sectional area along with a tapered plunger tip having a minimum cross-sectional area of about five ten-thousandths of a square inch or .026 inch in diameter. Thus, the actual orifice size in the transverse wall portion is made approximately six times the size of the maximum effective orifice opening. It has been found that this ensures good cleaning action by the force of the gases which would sweep therethrough to carry away foreign particles which would otherwise clog so small an opening during operation of the valve. It has also been found that a taper on the tip portion of the plunger member in the region of about one-fourth to three-fourths of a degree provides close control of the effective orifice opening during valve operation.

As stated previously, the length of the cylindrical extension 42 of the plunger member 36 should slightly exceed the width of the transversely extending wall portion 22 of the valve seat member 18, so that the orifice will be completely enlarged when the plunger member is moved into the valve seat member. The width of this transverse wall should be sufficient so that the sizing of the orifice by the cylindrical extension 42 of the plunger member will not cause distortion of the wall itself, but will permit accurate enlargement of the orifice opening. It has been found that a wall thickness of about .020 to .025 inch permits enlargement of the preliminary orifice 24a without significant distortion. The preliminary orifice should be approximately .001 inch less in diameter than the maximum diameter of the tapered tip 44 of the plunger member 36. This enables the production of a smooth and accurate final orifice in precise conformity with the tip of the plunger member.

Referring now to FIGS. 5 and 6, there may be seen, respectively, side elevational and end views of a modified form of the extension 42 and tapered tip of the plunger member 36. According to this modification, the tapered tip 44 of the cylindrical extension 42 is replaced by one or more "flats" 60 and a front end chamfer 62. The flats 60 may be precision ground on the surface of the cylindrical extension at a finer angle than that of the tapered tip 44, so as to obtain closer control of fuel flow during operation of the valve. This is because the taper of each flat is formed in only a single plane whereas the conically contoured tip 44 requires a multiplane taper. After the flats 60 are formed, the front end of the cylindrical extension is then chamfered. The purpose of this chamfer is to provide an initial lead into the unsized orifice 24a. Since the chamfer provides no fuel control function of itself, it need not be formed so finely or so accurately as the tapered tip 44 of the preceding embodiment.

It will be noted that because of the extremely fine angle of the tapered flats 60 they will extend a considerable distance up the length of the cylindrical extension 42. The ability of the extension to size the entire orifice, however, is not impaired nor need it be correspondingly elongated, for as shown in the arrangement of FIG. 1, the entire plunger member 36 including its cylindrical extension 42 rotates with rotation of the control knob 54. Thus the full diameter cylindrical regions between the tapered flats 60 are made to pass over the entire internal surface of the orifice 24 and bring it fully to size.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A method of manufacturing a precision valve assembly comprising the steps of providing a wall transversely across a gas passageway, providing a preliminary orifice of uniform cross-sectional dimension through said wall, providing a plunger having an extension with a maximum cross-section greater than the cross-section of said orifice, forcing said extension into said orifice until its maximum cross-section traverses the cross-section of said orifice.

2. A method of manufacturing a precision valve assembly comprising the steps of providing a wall transversely across a gas passageway, providing an orifice of a given shape and less than a given size through said wall, providing a plunger having an extension longer than the width of said wall and having thereon a tapered tip with a minimum cross-section which fits into said orifice and a maximum cross-section at least as great as said given size, forcing said tapered tip through said orifice until the maximum cross-section of said tapered tip traverses the entire thickness of said wall, and withdrawing said plunger until said tapered tip is in the vicinity of the entrance of said orifice.

3. A valve assembly comprising a valve seat member having a preliminary orifice extending therethrough, a plunger member including a tip portion having a straight sided extension both of which move into and out of said orifice, said tip portion and the straight sided extension thereof having a maximum cross section larger than the cross-sectional dimension of said preliminary orifice and said tip portion along with straight sided extension thereof being of a different hardness than the wall portion of said valve seat member defining said preliminary orifice for shaping and sizing the softer of said wall and tip portions into precise conformity with the harder of said wall and tip portions upon initial movement of the maximum cross section of said tip portion into said preliminary orifice, means for reciprocating said tip portion into and out of said orifice, and means for directing fluid flow through said orifice.

4. A valve assembly according to claim 3 wherein the straight sided extension of said tip portion is formed with at least one flat surface region extending longitudinally thereon tapering toward and extending to its terminal end, said terminal end being chamfered to a cross-sectional dimension smaller than the cross-sectional dimension of said preliminary orifice.

5. A valve assembly according to claim 3 wherein said tip portion is of harder material than the wall portion of said valve seat member.

6. A valve assembly according to claim 5 wherein said tip portion is tapered to a cross-sectional dimension at its terminal end which is smaller than the cross-sectional dimension of said preliminary orifice and terminates at the maximum cross section of said taper in said straight sided extension.

7. A self-cleaning valve assembly for controlling gas flow from a point of complete shut-off to a maximum commensurate wit ha given maximum effective orifice area, said valve assembly comprising a valve seat member formed with a preliminary orifice of predetermined cross-sectional dimension and with a total area substantially greater than said maximum effectve orifice area, a cooperating valve plunger having a tip portion tapering from a maximum cross section greater than the predetermined cross-sectional dimension of said preliminary orifice to a minimum cross section which is smaller than the cross-sectional dimension of said preliminary orifice and which differs in area from the area of said maximum cross section by an amount equal to said given maximum effective orifice area, said tip portion terminating abruptly beyond said minimum cross section and being of a material harder than the material of said valve seat for shaping and sizing said preliminary orifice to a cross-sectional size equal to the maximum cross section of said tip portion upon initial movement of said tip portion into said preliminary orifice, means for maintaining the tip portion of said plunger member in axial alignment with said orifice and for moving said plunger between an inner position where the surface of said plunger defining said maximum cross section shapes and sizes said orifice in precise conformity thereto and an outer position where said minimum cross section is displaced out and away from said orifice whereby particles collecting in and tending to clog the region between said plunger and said orifice are swept through said orifice by the increased force of fluid flow therethrough.

8. A valve assembly for controlling the flow of high vapor pressure fuel in its gaseous state to a burner, said valve assembly comprising an outer housing containing gas passage means therein, a valve seat member including a wall poriton extending transversely of said gas passage means within said outer housing, said wall portion being formed with a preliminary orifice having a cylindrical wall surface extending therethrough, an elongated plunger member connected to said housing on one side of said wall portion and having a tapered tip portion which terminates at its maximum cross section in a straight sided extension of a cross-sectional dimension larger than the cross-sectional dimension of said preliminary orifice, said straight sided extension having a length at least as great as the thickness of said wall portion and means for reciprocating said plunger longitudinally of the longitudinal axis of said orifice into and out of said orifice between a first position in which the straight sided extension is disposed on the one side of said wall portion and a second position in which at least a portion of the straight sided extension is positioned on the opposite side of said wall portion, said plunger being of a harder material than the wall surface of said orifice for sizing and shaping said orifice into precise conformity with the straight sided extension thereof as said straight sided extension is initially moved through said orifice from said first position to said second position.

9. A valve assembly according to claim 8 wherein said plunger is threadably engaged with said outer housing for rotation and longitudinal movement centrally within said gas passage means.

10. The valve assembly described in claim 9 wherein said elongated plunger member is provided with an additional surface which flares out from said extension at the end thereof opposite said tip portion, said additional surface being shaped to conform to the wall portion of said valve seat member surrounding said orifice to effect a locking gas seal when said device is not in use.

References Cited

UNITED STATES PATENTS

| | | | |
|---|---|---|---|
| 971,162 | 9/1910 | Winkler | 251—122 X |
| 2,192,339 | 3/1940 | Wilson | 251—334 |
| 2,644,662 | 7/1953 | Powers | 251—122 |
| 2,904,877 | 9/1959 | Edelen | 215—368 X |
| 3,086,749 | 4/1963 | Frye | 251—205 |
| 3,194,533 | 7/1965 | McLay | 251—368 X |
| 3,240,230 | 3/1966 | Callahan et al. | 251—205 X |
| 2,247,090 | 6/1941 | Jones et al. | 251—210 X |
| 2,660,192 | 11/1953 | Hunter | 137—318 |
| 2,950,637 | 8/1960 | Merrill et al. | 137—318 X |
| 2,980,392 | 4/1961 | Greenwood | 251—210 |
| 3,038,484 | 6/1962 | Smith | 137—318 X |
| 3,045,511 | 7/1962 | Risley | 137—318 X |
| 3,094,137 | 6/1963 | Burke | 137—318 |

M. CARY NELSON, *Primary Examiner.*

R. C. MILLER, *Assistant Examiner.*